(12) United States Patent
Lin et al.

(10) Patent No.: US 11,320,871 B2
(45) Date of Patent: May 3, 2022

(54) SEAMLESS HINGE AND ELECTRONIC DEVICE HAVING THE SAME

(71) Applicants: Che-Hsien Lin, Taipei (TW); Ko-Yen Lu, Taipei (TW)

(72) Inventors: Che-Hsien Lin, Taipei (TW); Ko-Yen Lu, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 0 days.

(21) Appl. No.: 16/877,507

(22) Filed: May 19, 2020

(65) Prior Publication Data

US 2020/0371561 A1 Nov. 26, 2020

Related U.S. Application Data

(60) Provisional application No. 62/851,083, filed on May 21, 2019.

(51) Int. Cl.
*G06F 1/16* (2006.01)
*E05D 11/10* (2006.01)
*E05D 3/12* (2006.01)
*E05D 3/18* (2006.01)

(52) U.S. Cl.
CPC .......... *G06F 1/1681* (2013.01); *E05D 3/122* (2013.01); *E05D 3/18* (2013.01); *E05D 11/1014* (2013.01); *G06F 1/1616* (2013.01); *E05Y 2900/606* (2013.01)

(58) Field of Classification Search
CPC .............................. G06F 1/1681; G06F 1/1616
See application file for complete search history.

(56) References Cited

U.S. PATENT DOCUMENTS

| 9,759,242 | B2 * | 9/2017 | Hsu | F16M 11/10 |
| 9,864,415 | B2 * | 1/2018 | Siddiqui | G06F 1/1681 |
| 10,303,207 | B2 * | 5/2019 | Yang | E05D 7/00 |
| 10,317,934 | B2 * | 6/2019 | Hampton | G06F 1/1616 |
| 10,480,227 | B1 * | 11/2019 | Chen | E05D 3/122 |
| 10,664,021 | B1 * | 5/2020 | Hsu | H04B 1/3888 |

(Continued)

FOREIGN PATENT DOCUMENTS

| CN | 207018340 | 2/2018 |
| CN | 208040904 | 11/2018 |

(Continued)

OTHER PUBLICATIONS

"Office Action of Taiwan Counterpart Application", dated Nov. 27, 2020, p. 1-p. 7.

(Continued)

*Primary Examiner* — Victor D Batson
*Assistant Examiner* — Matthew J Sullivan
(74) *Attorney, Agent, or Firm* — JCIPRNET

(57) ABSTRACT

A seamless hinge including two fixing frames, a shaft, and a carrying frame. The shaft is pivotally connected to the two fixing frames and has a gear portion located between the two fixing frames. The carrying frame is slidably disposed in the two fixing frames and has a rack portion engaged with the gear portion. The carrying frame is adapted to slide in an angular range relative to the two fixing frames and the shaft is driven by the rack portion, so that the carrying frame is pivotally rotated along a virtual axis.

18 Claims, 12 Drawing Sheets

(56) References Cited

U.S. PATENT DOCUMENTS

| | | | |
|---|---|---|---|
| 10,761,573 B2* | 9/2020 | Hsu | G06F 1/1681 |
| 10,983,569 B2* | 4/2021 | Lin | G06F 1/1616 |
| 11,016,541 B2* | 5/2021 | Lin | E05D 3/122 |
| 2020/0409427 A1* | 12/2020 | Hsu | G06F 1/1681 |
| 2020/0409429 A1* | 12/2020 | Hsu | G06F 1/1652 |
| 2021/0076511 A1* | 3/2021 | Yang | G09F 9/301 |
| 2021/0165466 A1* | 6/2021 | Kang | H04B 1/3833 |
| 2021/0173449 A1* | 6/2021 | Yao | G06F 1/1681 |
| 2021/0181808 A1* | 6/2021 | Liao | G06F 1/1681 |
| 2021/0195775 A1* | 6/2021 | Zhao | F16C 11/04 |
| 2021/0200277 A1* | 7/2021 | Park | G06F 1/16 |
| 2021/0223827 A1* | 7/2021 | Moon | G06F 1/1652 |

FOREIGN PATENT DOCUMENTS

| | | |
|---|---|---|
| TW | M471736 | 2/2014 |
| TW | M520582 | 4/2016 |

OTHER PUBLICATIONS

"Office Action of China Counterpart Application", dated Nov. 2, 2021, p. 1-p. 8.

\* cited by examiner

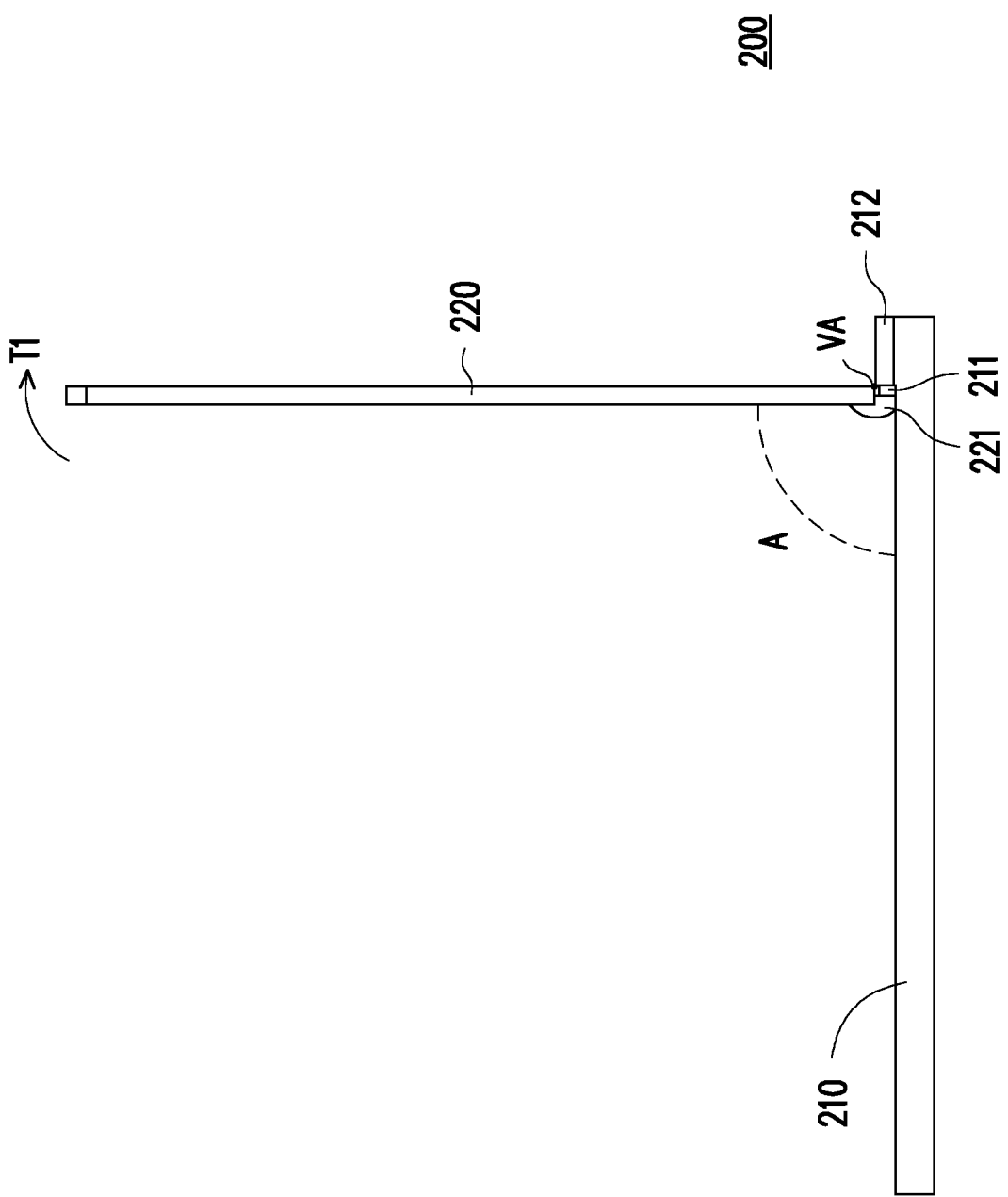

SEAMLESS HINGE AND ELECTRONIC DEVICE HAVING THE SAME

CROSS-REFERENCE TO RELATED APPLICATION

This application claims the priority benefit of U.S. provisional application Ser. No. 62/851,083, filed on May 21, 2019. The entirety of the above-mentioned patent application is hereby incorporated by reference herein and made a part of this specification.

BACKGROUND

Field of the Disclosure

The disclosure relates to a hinge, and particularly to a seamless hinge applied to an electronic device and rotating along a virtual axis.

Description of Related Art

Existing notebook computers include a display screen, a host, and a hinge module. The display screen and the host are pivotally connected to each other through the hinge module to facilitate opening and closing. However, the existing hinge module typically uses the pivot as the physical rotation axis, and therefore a space needs to be reserved between the display screen and the host to avoid interference between the display screen and the host during the rotation process.

Therefore, when the notebook computer is switched to the opening state, a gap is formed, and it is impossible to hide a part of the hinge module between the display screen and the host; as a result, the notebook computer in the opening state is unaesthetic.

For this reason, it becomes an important goal to develop a seamless hinge capable of reducing the gap between the display screen and the host in the opening state and hiding the hinge to attain a beautiful appearance and reduced size.

SUMMARY OF THE DISCLOSURE

The disclosure provides a seamless hinge and an electronic device. The seamless hinge is adapted to be pivotally rotated along a virtual axis. When the seamless hinge is applied to an electronic device, the gap of the electronic device in the opening state can be reduced, and the seamless hinge can be hidden in the electronic device, thus achieving the effect of aesthetic appearance and size reduction.

A seamless hinge of the disclosure includes two fixing frames, a shaft, and a carrying frame. The shaft is pivotally connected to the two fixing frames and has a gear portion located between the two fixing frames. The carrying frame is slidably disposed in the two fixing frames and has a rack portion engaged with the gear portion. The carrying frame is adapted to slide in an angular range relative to the two fixing frames and the shaft is driven by the rack portion, so that the carrying frame is pivotally rotated along a virtual axis.

The electronic device of the disclosure includes a first body, a second body, and a plurality of seamless hinges. The first body has a first space and a first cover. The first cover is disposed in the first space. The second body has a second cover for accommodating the first cover. A plurality of seamless hinges are arranged in the first cover and respectively connect the first body and the second body. Each of the seamless hinges includes two fixing frames, a shaft and a carrying frame. The two fixing frames are connected to the first cover. The shaft is pivotally connected to the two fixing frames and has a gear portion, which is located between the two fixing frames. The carrying frame is slidably arranged in the two fixing frames and has a rack portion, which is engaged with the gear portion. The first body and the second body are adapted to be closed or opened relative to each other, so that the respective corresponding carrying frames slide relative to the two fixing frames within an angular range and drive the respective shafts through the respective rack portions. Accordingly, each of the carrying frames is pivotally rotated along a virtual axis, and when being closed relative to each other, the first cover and the second cover are accommodated in the first space, and when being opened relative to each other, the first cover and the second cover are separated from each other.

Based on the above, the carrying frame of the seamless hinge of the disclosure is adapted to slide along two fixing assemblies and drive the shaft, so that the carrying frame is pivotally rotated along a virtual axis, thereby reducing the swinging range of the carrying frame. In addition, the carrying frame can only slide relative to the two fixing frames within an angular range, thereby limiting the pivoting angle of the carrying frame.

Further, a plurality of seamless hinges respectively connect the first body and the second body of the electronic device. When the first body and the second body are opened relative to each other to 180 degrees, the respective corresponding carrying frames are respectively driven to slide relative to the two fixing frames and the respective shafts are driven through the respective rack portions. Accordingly, each of the carrying frames is pivotally rotated along a virtual axis to 90 degrees, and the seamless hinge is hidden in the first body and the second body, and the first body and the second body partially abut against each other to reduce the gap, so that the electronic device has a beautiful appearance with reduced size.

BRIEF DESCRIPTION OF THE DRAWINGS

FIG. 4A is a schematic side view of the electronic device of FIG. 2 opened to 90 degrees.

DESCRIPTION OF EMBODIMENTS

Figure 1A:
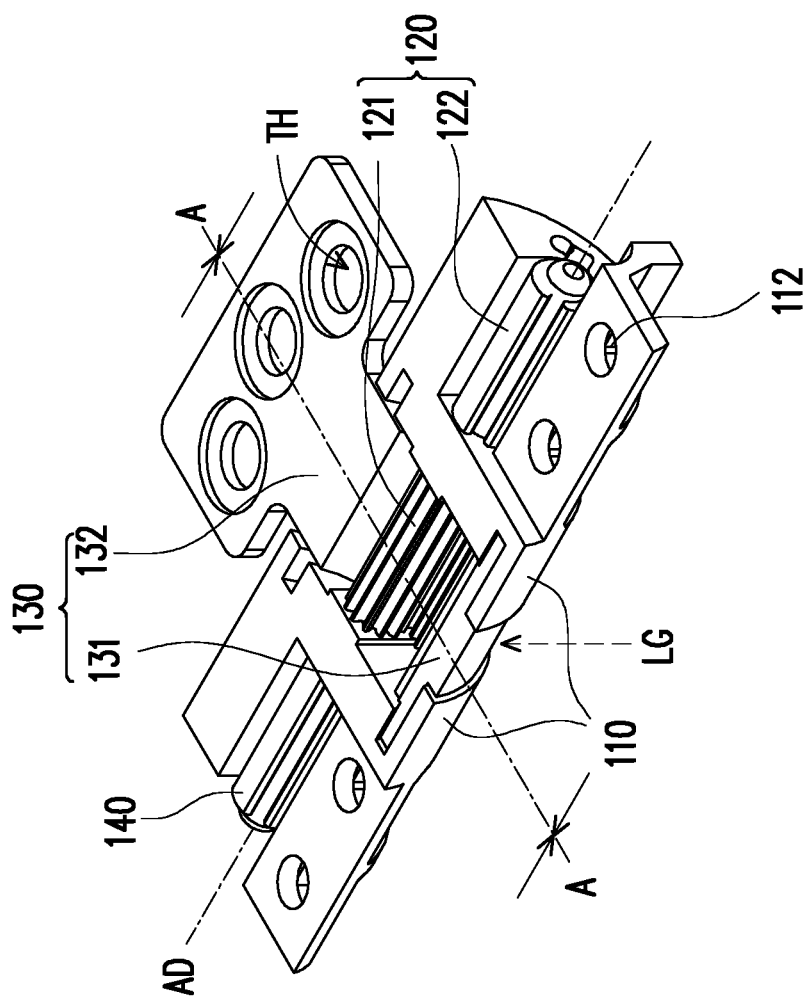
FIG. 1A is a three-dimensional schematic view of a seamless hinge according to an embodiment of the disclosure.
Figure 1B:
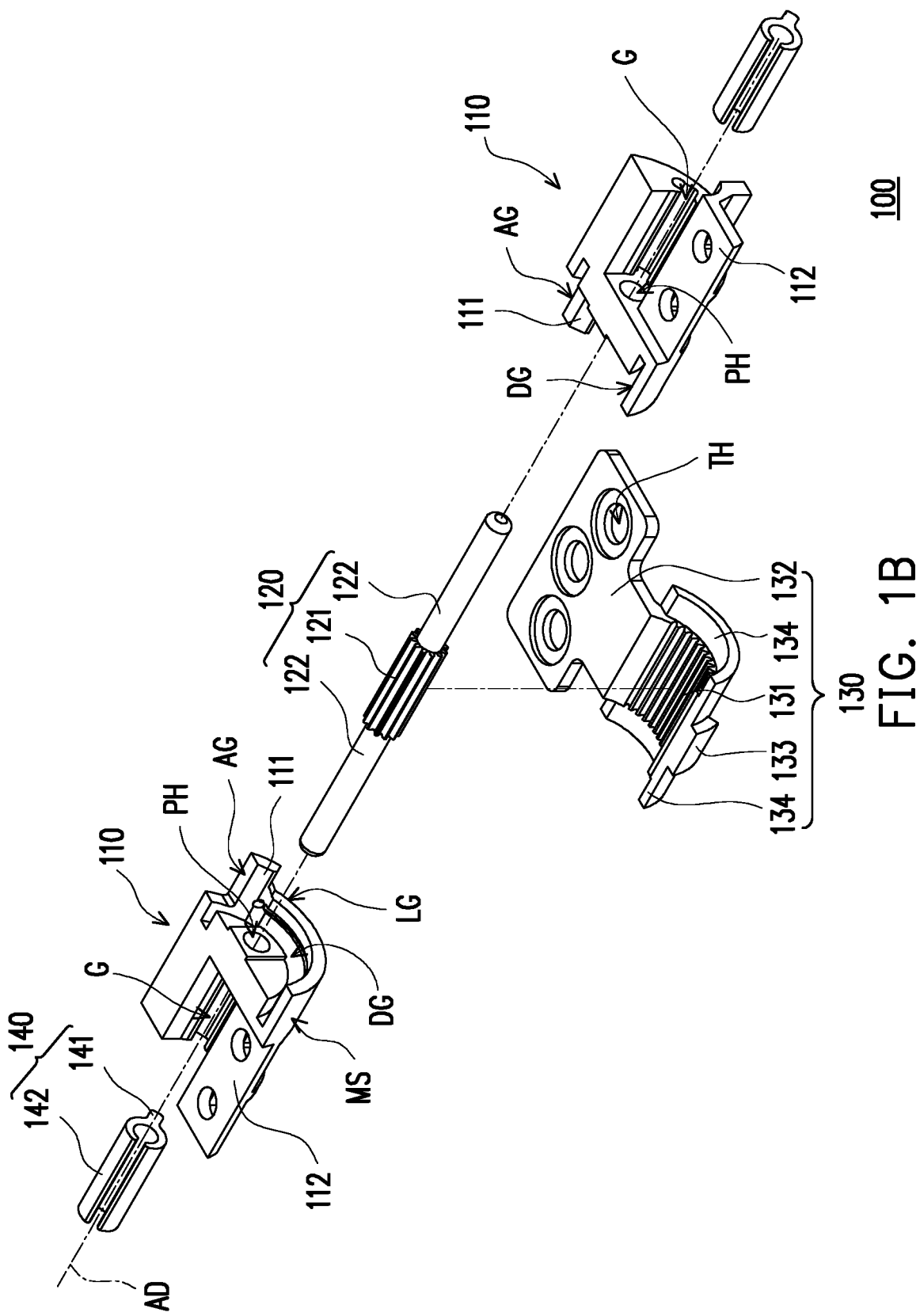
FIG. 1B is another three-dimensional schematic view of the seamless hinge of FIG. 1A.
Figure 1C:
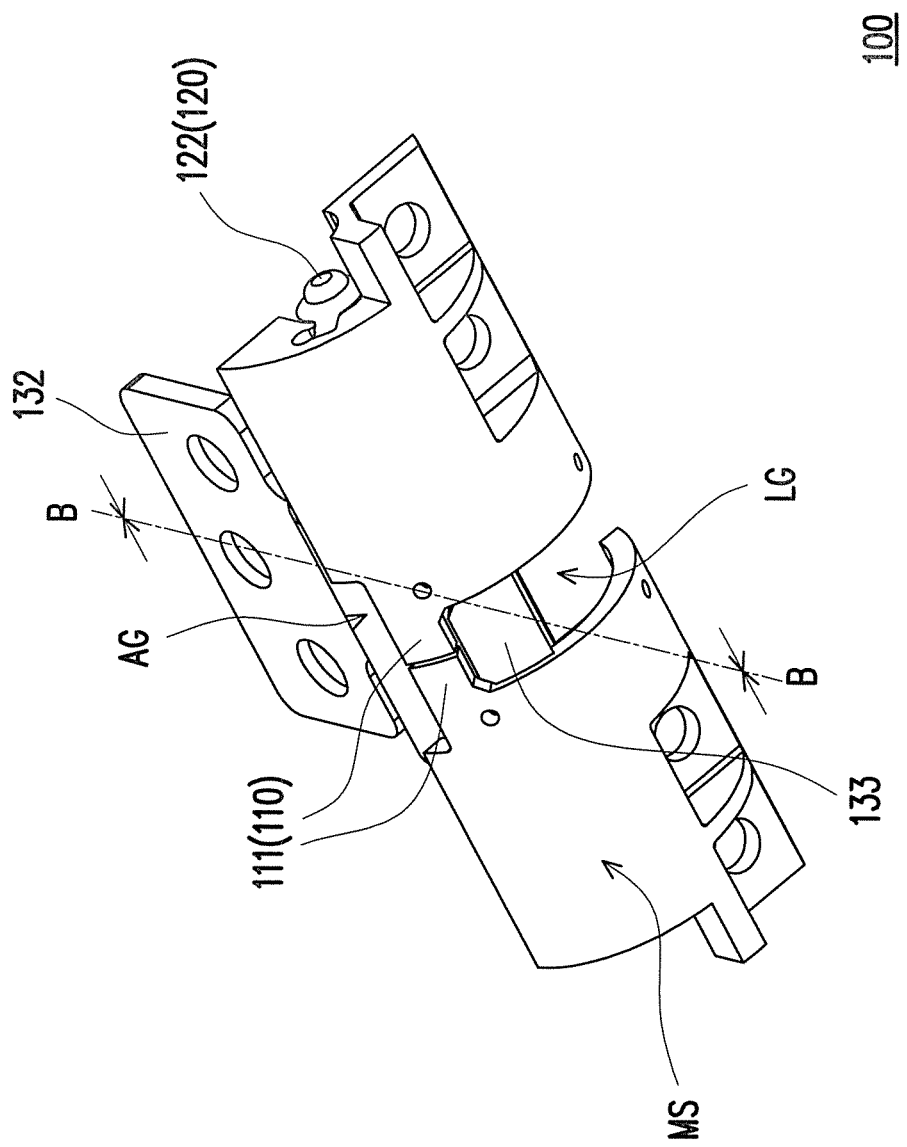
FIG. 1C is an exploded schematic view of the elements of the seamless hinge of FIG. 1A.
Figure 1D:
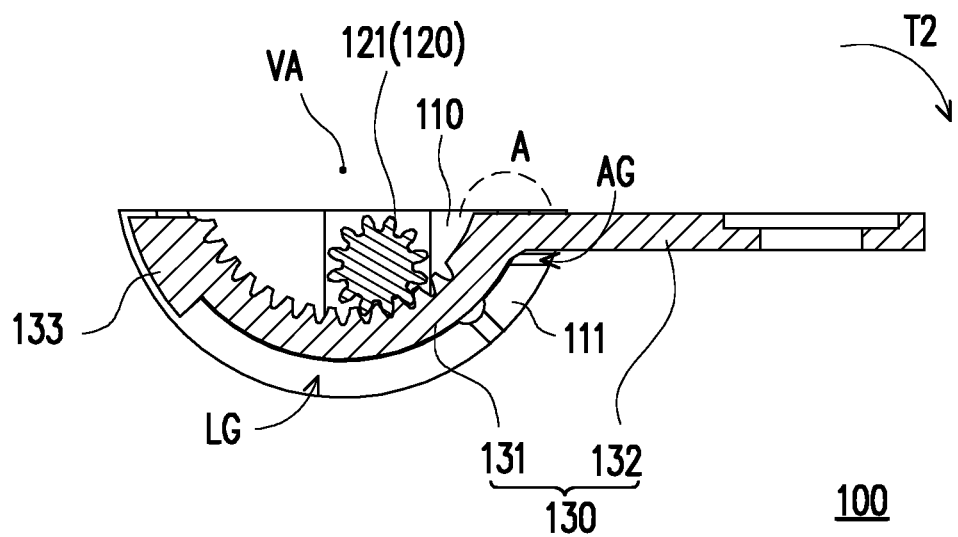
FIG. 1D is a schematic cross-sectional view of the seamless hinge of FIG. 1A taken along line A-A.
Figure 1E:
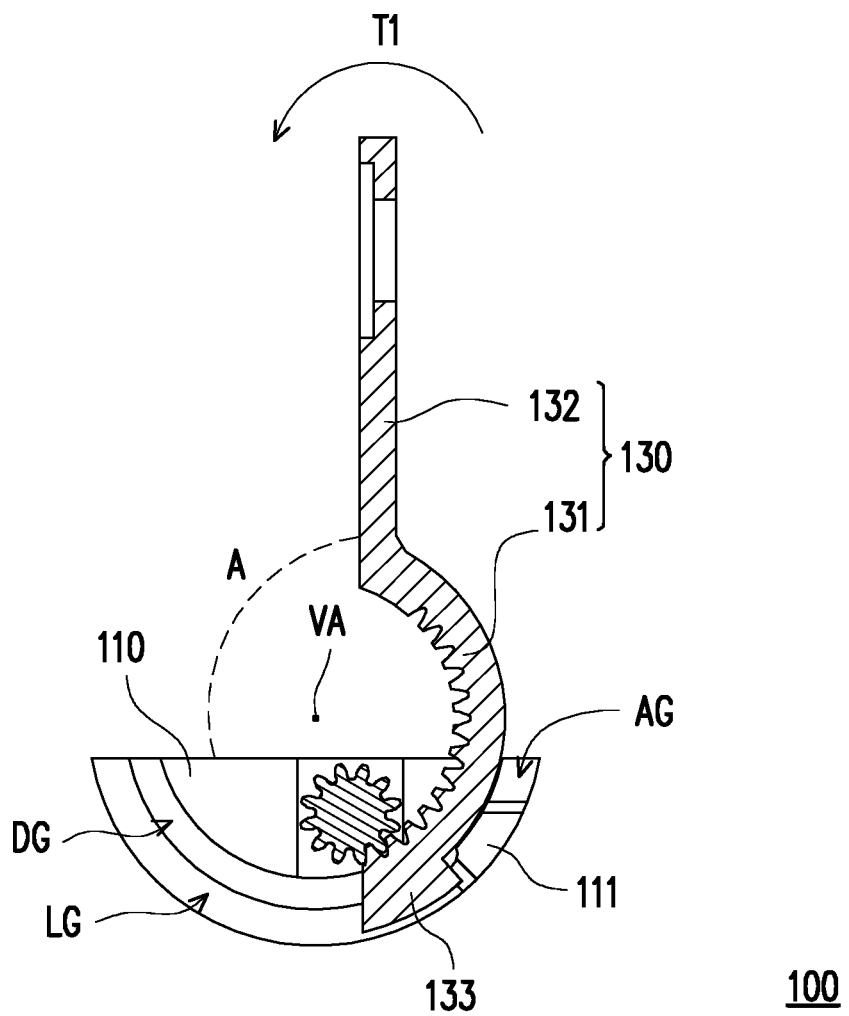
FIG. 1E is a schematic cross-sectional view of the seamless hinge of FIG. 1B taken along line B-B.

FIG. 1A is a three-dimensional schematic view of a seamless hinge according to an embodiment of the disclosure. FIG. 1B is another three-dimensional schematic view of the seamless hinge of FIG. 1A. FIG. 1C is an exploded schematic view of the elements of the seamless hinge of FIG. 1A. FIG. 1D is a schematic cross-sectional view of the seamless hinge of FIG. 1A taken along line A-A. FIG. 1E is a schematic cross-sectional view of the seamless hinge of FIG. 1B taken along line B-B.

Figure 1F:
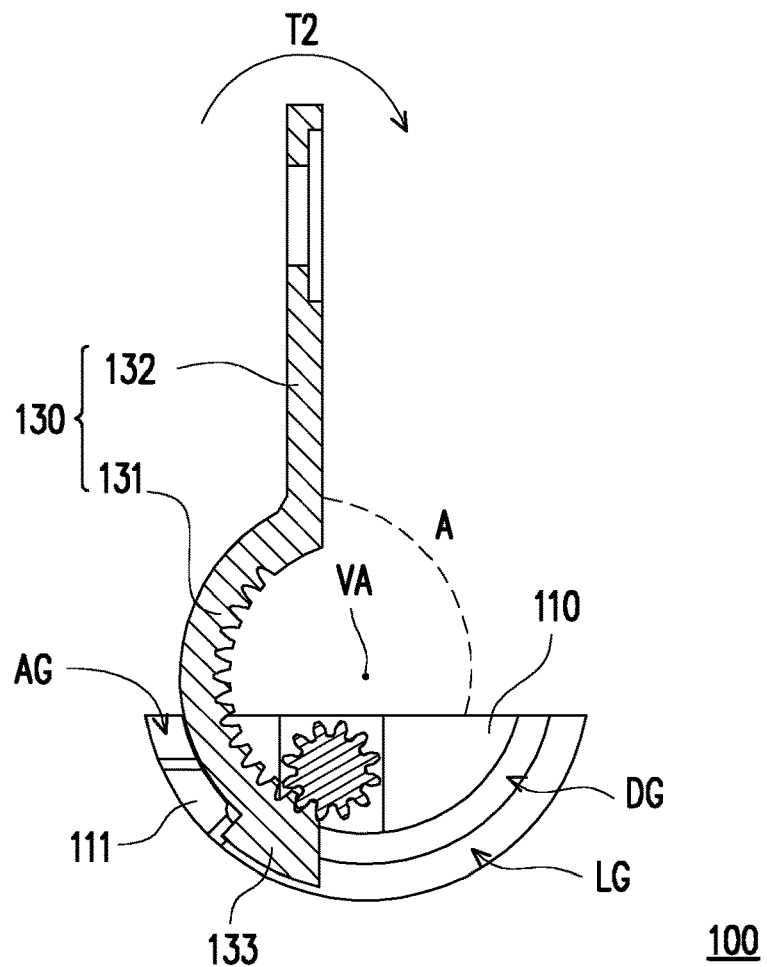
FIG. 1F is a schematic cross-sectional view of the seamless hinge of FIG. 1A taken along line A-A in another direction.
Figure 1G:
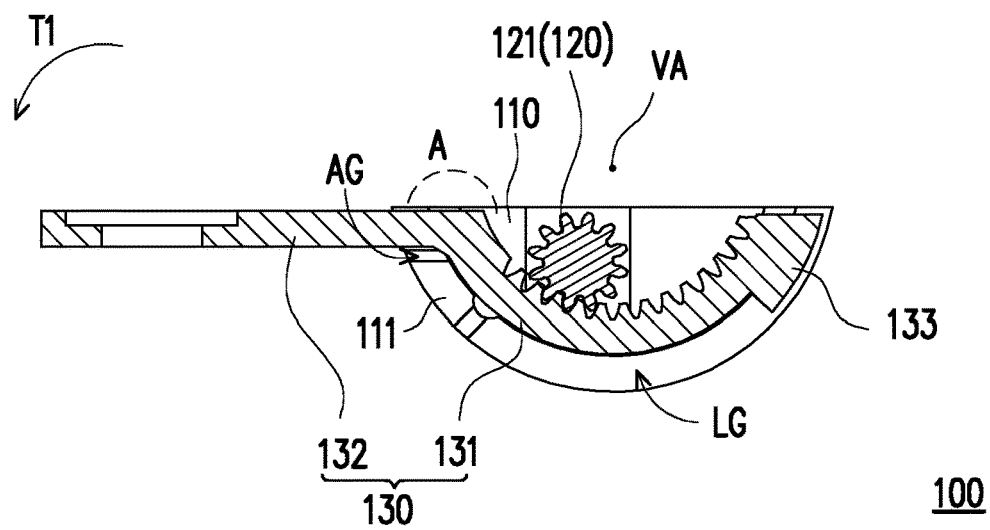
FIG. 1G is a schematic cross-sectional view of the seamless hinge of FIG. 1B taken along line B-B in another direction.

FIG. 1F is a schematic cross-sectional view of the seamless hinge of FIG. 1A taken along line A-A in another direction. FIG. 1G is a schematic cross-sectional view of the seamless hinge of FIG. 1B taken along line B-B in another direction.

Referring to FIG. 1A to FIG. 1C, the seamless hinge 100 of the embodiment includes two fixing frames 110, a shaft 120, a carrying frame 130, and two torsion members 140.

The two fixing frames 110 are spaced apart from each other and are located on the same axis AD.

The shaft 120 is pivotally connected to the two fixing frames 110 and has a gear portion 121 and two turning portions 122. The gear portion 121 is located between the two fixing frames 110 and can be pivotally rotated relative to the two fixing frames 110. The two turning portions 122 are extended along the axial direction AD and formed at the opposite ends of the gear portion 121. Each of the fixing frames 110 has a pivot hole PH. The two turning portions 122 are rotatably disposed through the two pivot holes PH of the two fixing frames 110 respectively.

The carrying frame 130 is slidably disposed between the two fixing frames 110 and has a rack portion 131 and a connecting portion 132. The rack portion 131 is, for example, a gear portion 121 having an annular appearance and engaged with the shaft 120. When the carrying frame 130 slides relative to the two fixing frames 110, the shaft 120 can be driven to rotate pivotally along the axial direction AD through the engaging relationship between the rack portion 131 and the gear portion 121. The connecting portion 132 is formed at one end of the rack portion 131, and a plurality of through holes TH are formed through the upper and lower walls of the connecting portion 132 and the connecting portion 132 protrudes outside the two fixing frames 110.

The two torsion members 140 are respectively disposed in the two fixing frames 110, and each of the torsion members 140 has an engaging portion 141 and a clamping portion 142. Each of the engaging portions 141 is disposed in a groove G of each of the fixing frames 110, and each of the clamping portions 142 clamps each of the corresponding turning portions 122 to provide a torque force. In addition, when the shaft 120 rotates, each of the turning portions 122 and each of the clamping portions 142 generates a torque force due to the friction between each other. When the shaft 120 is stationary, the clamping portion 142 maintains the pivoting angle of the shaft 120 relative to the two fixing frames 110 by the external clamping force.

Referring to FIG. 1D to FIG. 1F, the carrying frame 130 is adapted to slide within an angular range A (which is between 180 degrees and 90 degrees as shown in the figure) relative to the two fixing frames 110 and drives the shaft 120 to rotate pivotally relative to the fixing frame 110 through the rack portion 131, such that the carrying frame 130 rotates pivotally along a virtual axis VA, wherein the virtual axis VA is the center of the rack portion 131.

Referring to FIG. 1A to FIG. 1C, each of the fixing frames 110 has a stopper 111 and the two stoppers 111 of the two fixing frames 110 extend toward each other and abut against each other. A position-limiting slot LG is formed between the two fixing frames 110 and located on one side of the two stoppers 111. The carrying frame 130 has a slider 133 formed on the lateral surface S of the rack portion 131 and away from the connecting portion 132. The slider 133 is slidably disposed in the position-limiting slot LG. The slider 133 is adapted to reciprocate in the position-limiting slot LG to abut against or move away from the two stoppers 111.

With reference to FIG. 1D and FIG. 1E, when the carrying frame 130 rotates pivotally in a first rotation direction T1 and is perpendicular to each of the fixing frames 110, the slider 133 abuts against the two stoppers 111 and are blocked (here, the angle A between the carrying frame 130 and each of the fixing frames 110 is 90 degrees). When the carrying frame 130 rotates pivotally in a second rotation direction T2 opposite to the first rotation direction T1, the slider 133 moves away from the two stoppers 111 (here, the angle A between the carrying frame 130 and each of the fixing frames 110 is greater than 90 degrees).

In addition, referring to FIG. 1G and FIG. 1F, they can also be regarded as a situation where the seamless hinge 100 rotates pivotally in the direction opposite to FIG. 1D and FIG. 1E. When the carrying frame 130 rotates pivotally toward the second rotation direction T2 and is perpendicular to each of the fixing frames 110, the slider 133 abuts against the two stoppers 111 and are blocked (here, the angle A between the carrying frame 130 and each of the fixing frames 110 is 90 degrees). When the carrying frame 130 rotates pivotally in the first rotation direction T1 opposite to the second rotation direction T2, the slider 133 is away from the two stoppers 111 (here, the angle A between the carrying frame 130 and each of the fixing frames 110 is greater than 90 degrees).

The two fixing frames 110 have an accommodating slot AG formed on the other side of the two stoppers 111 relative to the position-limiting slot LG. When the carrying frame 130 rotates pivotally in the second rotation direction T2 and is parallel with each of the fixing frames 110 (here, the angle A between the carrying frame 130 and each of the fixing frames 110 is 180 degrees), the connecting portion 132 of the carrying frame 130 is engaged with the accommodating slot AG. Therefore, in the embodiment, the rotation angular range of the carrying frame 130 and the two fixing frames 110 is between 180 degrees and 90 degrees. In other embodiments, the angular range between the carrying frame and the two fixing frames is, for example, greater than 180 degrees and less than 90 degrees depending on requirements.

Referring to FIG. 1A to FIG. 1C, each of the fixing frames 110 has a guiding slot DG, which surrounds the periphery of the shaft 120. The carrying frame 130 has two sliding portions 134 respectively formed on opposite sides I of the rack portion 131 and disposed in the two guiding slots DG. Specifically, the two sliding portions 134 slide along the two guiding slots DG, so that the carrying frame 130 slides relative to the two fixing frames 110. Since the guiding slot DG has an arc-shaped path, the virtual axis VA is also the center of the guiding slot DG.

Each of the fixing frames 110 has a sliding surface MS and a locking portion 112. The sliding surface MS is an arc surface and is adapted to slide in an arc space. Each of the locking portions 112 is formed on a wall surface of each of the fixing frames 110 relative to each of the guiding slots DG.

Figure 2:
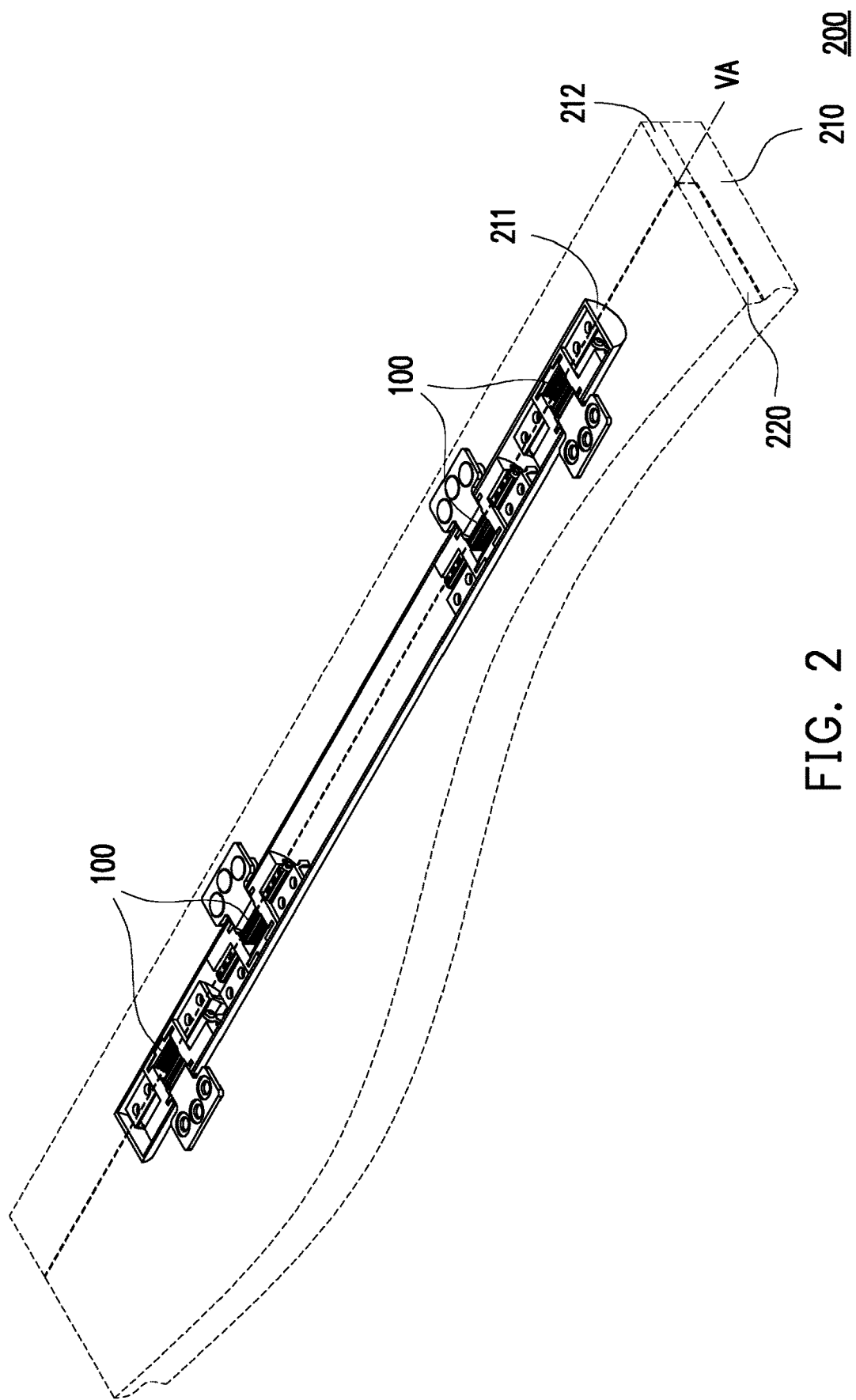
FIG. 2 is a schematic perspective view of an electronic device incorporating multiple seamless hinges according to an embodiment of the disclosure.

FIG. 2 is a schematic perspective view of an electronic device incorporating multiple seamless hinges according to an embodiment of the disclosure.

Please refer to FIG. 1A and FIG. 2 both, multiple seamless hinges 100 are suitable for the electronic device 200. The electronic device 200 is, for example, a notebook computer, a tablet computer, or other similar products and includes a first body 210, a second body 220, and a plurality of seamless hinges 100.

The first body 210 has a first space S1 and a first cover 211, the first cover 211 is disposed in the first space S1. The second body 220 has a second cover 221 for accommodating the first cover 211. The plurality of seamless hinges 100 are disposed in the first cover 211 and respectively connect the first body 210 and the second body 220. In detail, the number of the plurality of seamless hinges 100 is, for example, four; and the two connecting portions 132 of the two inner seamless hinges 100 in the first cover 211 are connected to the first body 210, and the two connecting portions 132 of the two outer seamless hinges 100 in the first cover 211 are connected to the second body 220. In addition, the first body 210 has a heat dissipating portion 212, which is configured for arranging heat dissipating fins or heat dissipating holes, so as to improve the heat dissipating efficiency of the electronic device 200.

Specifically, the first body 210 and the second body 220 are switched to the opening state (opened by 90 degrees in FIG. 4A and 180 degrees in FIG. 5A) and the closed state (contact each other in FIG. 3A) through the plurality of seamless hinges 100. In other embodiments, the electronic device 200 may adopt an even number of seamless hinges 100.

With reference to FIG. 1D and FIG. 1E, the first body 210 and the second body 220 are adapted to be closed or opened relative to each other, so that each of the corresponding carrying frames 130 slides with respect to the two fixing frames 110 in an angular range and drives each of the shafts 120 through each of the rack portions 131, so that each of the carrying frames 130 rotates pivotally along the virtual axis VA. When being closed relative to each other, the first cover 211 and the second cover 221 are accommodated in the first space S1, and when being opened relative to each other, the first cover 211 and the second cover 221 are separated from each other.

Figure 3A:
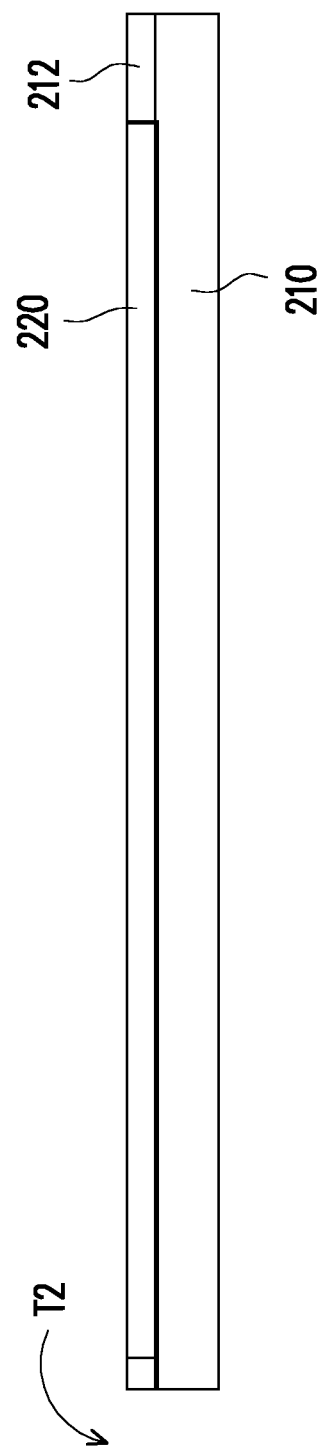
FIG. 3A is a schematic side view of the electronic device of FIG. 2 in a closed state.
Figure 3B:
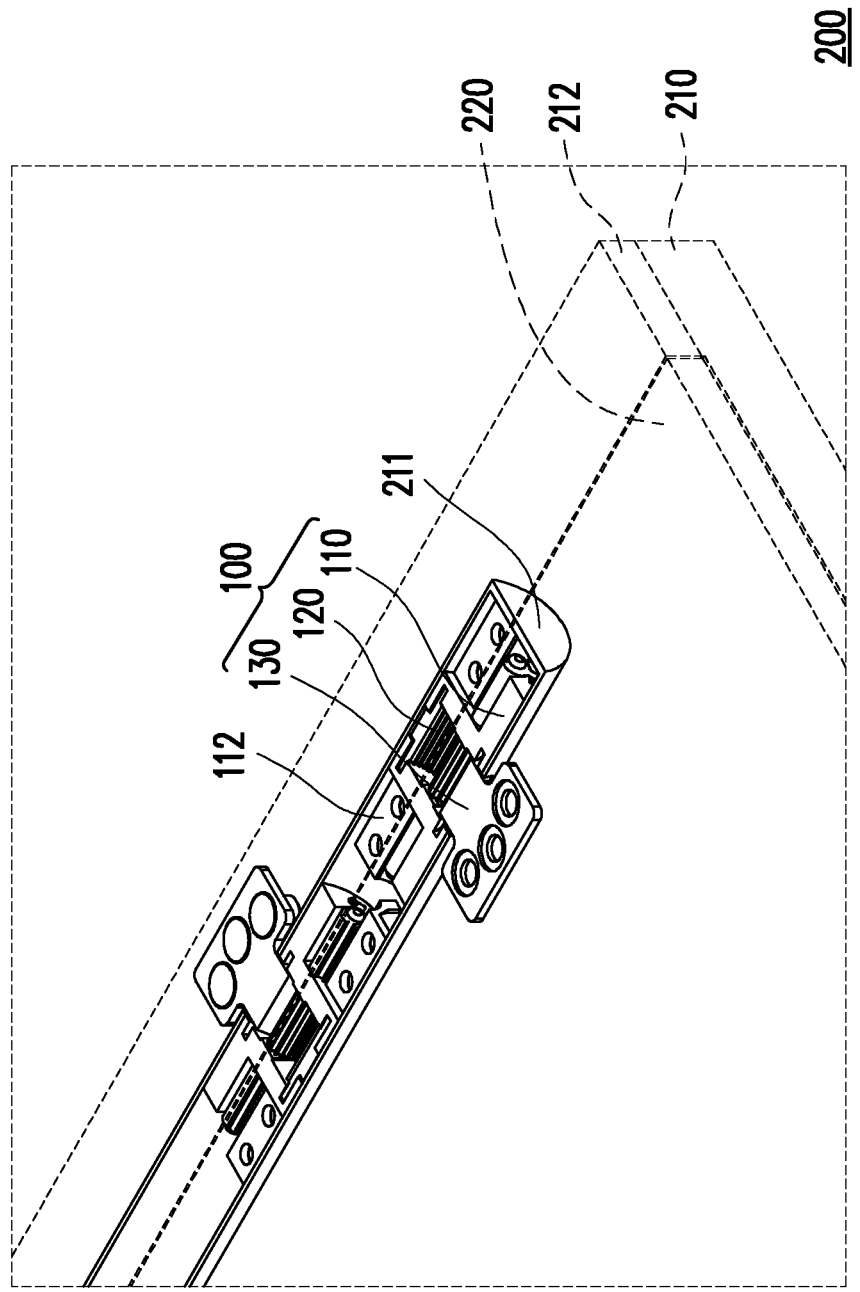
FIG. 3B is a schematic perspective view of the electronic device of FIG. 3A.

FIG. 3A is a schematic side view of the electronic device of FIG. 2 in a closed state. FIG. 3B is a schematic perspective view of the electronic device of FIG. 3A.

Referring to FIG. 2, FIG. 3A and FIG. 3B, when the first body 210 and the second body 220 are closed relative to each other, the second body 220 and the first body 210 are attached to each other to form a rectangular structure, and the first cover 211 and the second cover 221 are accommodated in the first space S1. Specifically, an angle A between each of the carrying frames 130 and each of the fixing frames 110 shown in FIG. 1A and FIG. 1D is 180 degrees, and the connecting portion 132 of each of the carrying frames 130 is engaged with the accommodating slot AG.

Figure 4B:
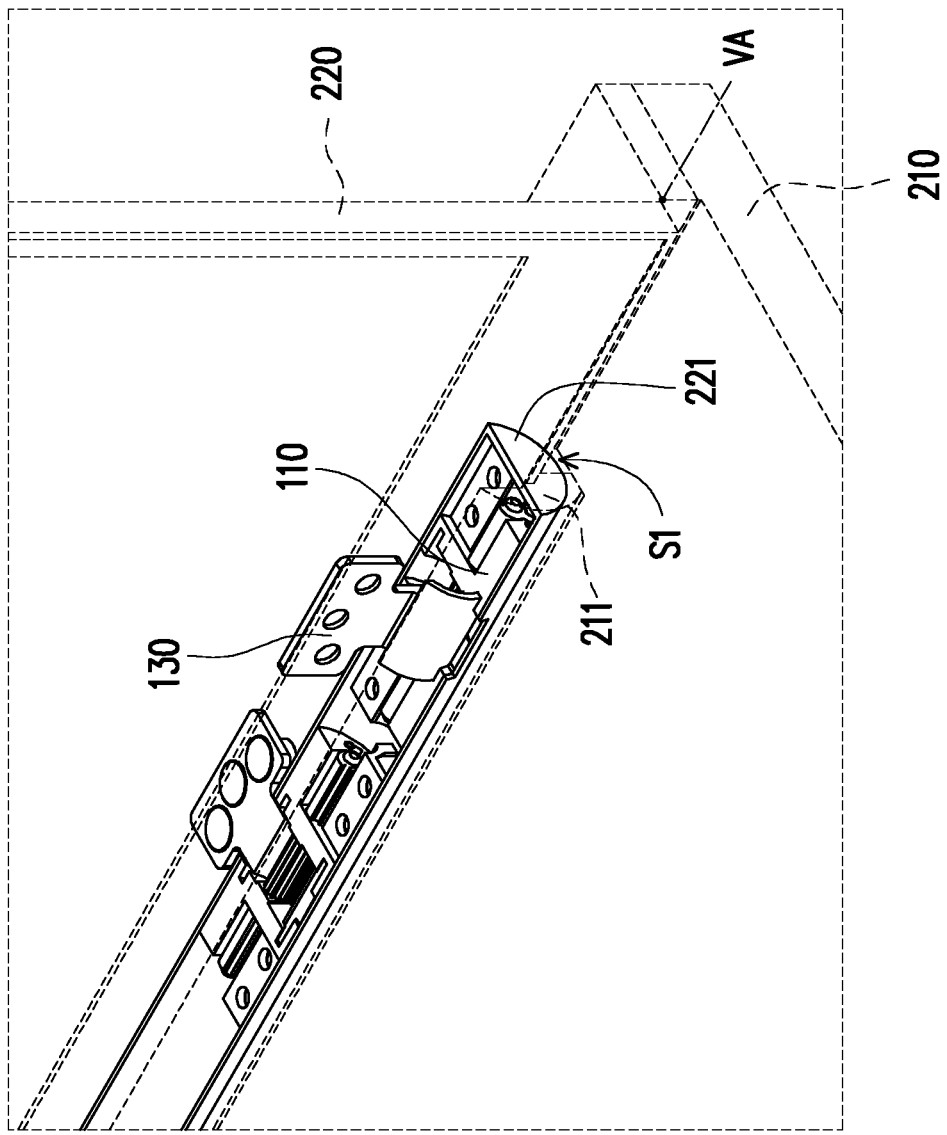
FIG. 4B is a schematic perspective view of the electronic device of FIG. 4A.

FIG. 4A is a schematic side view of the electronic device of FIG. 2 opened to 90 degrees. FIG. 4B is a schematic perspective view of the electronic device of FIG. 4A.

Referring to FIG. 4A and FIG. 4B, when the first body 210 and the second body 220 are opened relative to each other to 90 degrees, firstly, the second body 220 drives the two connecting portions 132 outside the first cover 211, so that the two carrying frames 130 rotate pivotally relative to the plurality of fixing frames 110 to 90 degrees along the virtual axis VA. Accordingly, the second body 220 is suspended from the first body 210 and the second cover 221 is separated from and perpendicular to the first cover 211. Under the circumstances, the two sliders 133 of the above two outer carrying frames 130 respectively abut against the plurality of corresponding stoppers 111 (refer to FIG. 1F). In addition, the two inner seamless hinges 100 of the first cover 211 are still in the initial state at an angle of 180 degrees (see FIG. 1D).

Figure 5A:
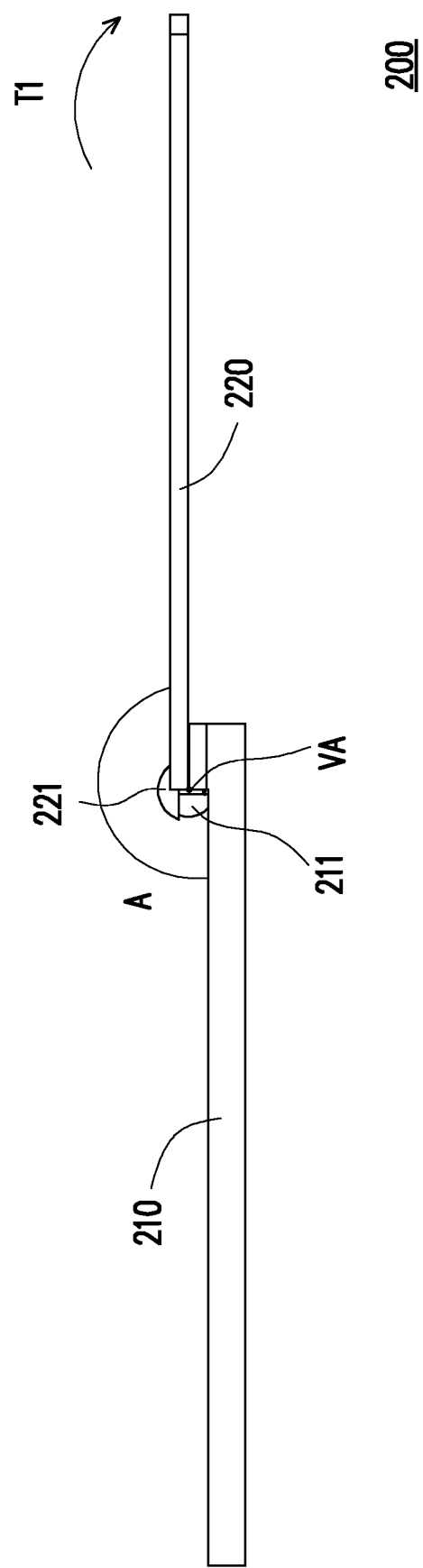
FIG. 5A is a schematic side view of the electronic device of FIG. 2 opened to 180 degrees.
Figure 5B:
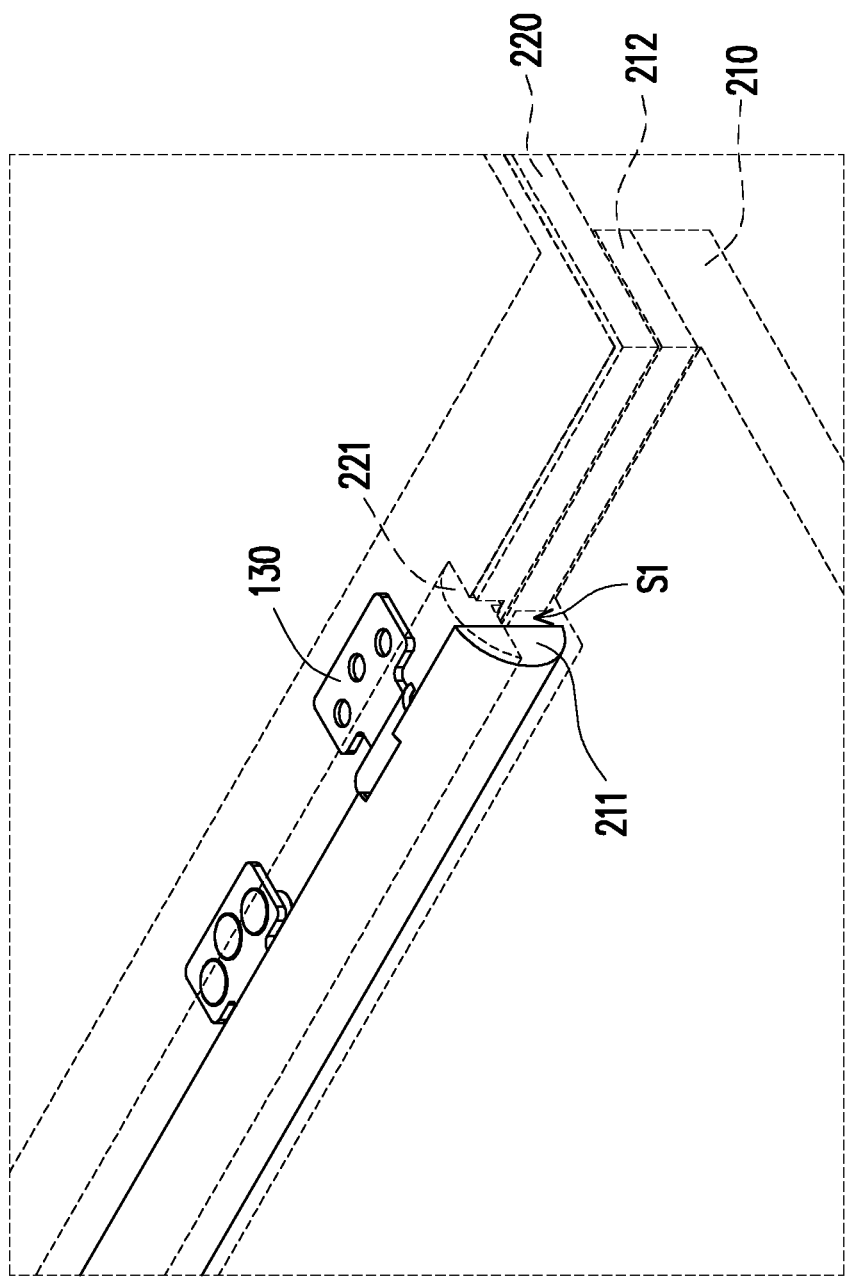
FIG. 5B is a schematic perspective view of the electronic device of FIG. 3A.

FIG. 5A is a schematic side view of the electronic device of FIG. 2 opened to 180 degrees. FIG. 5B is a schematic perspective view of the electronic device of FIG. 3A.

Referring to FIG. 5A and FIG. 5B, when the first body 210 and the second body 220 are continuously opened to 180 degrees, since the two sliders 133 of the two carrying frames 130 outside the first cover 211 respectively abut against the plurality of corresponding stoppers 111 (refer to FIG. 1F), the two outer carrying frames 130 start to drive the first cover 211 and the two inner carrying frames 130 to rotate pivotally. Specifically, the first cover 211 simultaneously drives the plurality of inner fixing frames 110, so that the plurality of inner fixing frames 110 slide relative to the two inner carrying frames 130 and rotate pivotally to 90 degrees along the virtual axis VA (refer to FIG. 1E), and the second body 220 partially overlaps and is parallel to the first body 210. Under the circumstances, the two sliders 133 of the two inner carrying frames 130 respectively abut against the plurality of corresponding stoppers 111 (refer to FIG. 1E and FIG. 5B), and the first cover 211 partially protrudes outside the first space S1.

Briefly, the electronic device 200 of the embodiment uses an even number of seamless hinges 100 arranged in opposite directions, and which are respectively connected to the first body 210 and the second body 220 in a locked manner. During the opening process of the first body 210 and the second body 220, the plurality of seamless hinges 100 locked to the second body 220 are first turned to 90 degrees, and then the plurality of seamless hinges 100 locked to the first body 210 are turned to 90 degrees, such that the first body 210 and the second body 220 are opened relative to each other to 180 degrees.

Further, the pivoting sequence of the plurality of seamless hinges 100 may be from the outer side to the inner side, from the inner side to the outer side or to the inner and outer side simultaneously, which depends on the preset torque force of each of the seamless hinges 100.

In summary, the carrying frame of the seamless hinge of the disclosure is adapted to slide along two fixing assemblies and drive the shaft, so that the carrying frame rotates pivotally along a virtual axis, thereby reducing the swinging range of the carrying frame. In addition, the carrying frame can only slide relative to the two fixing frames within an angular range, thereby limiting the pivoting angle of the carrying frame.

Further, the plurality of seamless hinges respectively connect the first body and the second body of the electronic device. When the first body and the second body are opened relative to each other to 180 degrees, the respective corresponding carrying frames are respectively driven to slide relative to the two fixing frames and the respective shafts are driven through the respective rack portions. Accordingly, each of the carrying frames rotates pivotally to 90 degrees along a virtual axis, and the seamless hinge is hidden in the first body and the second body, and the first body and the second body partially abut against each other to reduce the gap, so that the electronic device has a beautiful appearance with reduced size.

What is claimed is:

1. A seamless hinge, comprising:
    two fixing frames;
    a shaft, pivotally connected to the two fixing frames and having a gear portion located between the two fixing frames;
    a carrying frame slidably arranged in the two fixing frames and having a rack portion engaged with the gear portion; and
    two torsion members, which are respectively arranged in the two fixing frames, and each of the torsion members has an engaging portion and a clamping portion, and each of the engaging portions is arranged in a groove of each of the fixing frames, each of the clamping portions clamps each of the corresponding turning portions to provide a torque force,
    wherein, the carrying frame is adapted to slide relative to the fixing frames within an angular range and drive the shaft through the rack portion, so that the carrying frame rotates pivotally along a virtual axis.

2. The seamless hinge according to claim 1, wherein each of the fixing frames has a stopper, the two stoppers abut against each other, and a position-limiting slot is formed between the two fixing frames and located on one side of the two stoppers, the position-limiting slot is located on a lateral surface of the carrying frame, and the rack portion is disposed on the other lateral surface of the carrying frame opposite to the lateral surface.

3. The seamless hinge according to claim 2, wherein the carrying frame has a slider, which is formed on the lateral surface of the rack portion and disposed in the position-limiting slot, and the slider is adapted to reciprocate in the position-limiting slot.

4. The seamless hinge according to claim 3, wherein when the carrying frame rotates pivotally toward a first rotation direction and is perpendicular to each of the fixing frames, the slider abuts against the two stoppers, and when the carrying frame rotates pivotally toward a second rotation direction opposite to the first rotation direction, the slider is away from the two stoppers.

5. The seamless hinge according to claim 3, wherein the two fixing frames have an accommodating slot formed on the other side of the two stoppers relative to the position-limiting slot, when the carrying frame rotates pivotally toward a second rotation direction and is parallel to each of the fixing frames, the carrying frame is engaged with the accommodating slot.

6. The seamless hinge according to claim 1, wherein each of the fixing frames has a guiding slot surrounding a periphery of the shaft, the carrying frame has two sliding portions respectively formed on opposite sides of the rack portion and respectively arranged in the two guiding slots.

7. The seamless hinge according to claim 1, wherein the shaft has two turning portions, which are extended along an axial direction and formed at both ends of the gear portion, each of the fixing frames has a pivot hole, and the two turning portions are rotatably disposed through the two pivot holes of the two fixing frames respectively.

8. The seamless hinge according to claim 1, wherein the carrying frame has a connecting portion formed at one end of the rack portion and a plurality of through holes are formed on the connecting portion in a penetrating manner.

9. The seamless hinge according to claim 6, wherein each of the fixing frames has a sliding surface and a locking portion, the sliding surface is an arc surface, and each of the locking portions is formed on a wall surface of each of the fixing frames relative to each of the guiding slots.

10. An electronic device, comprising:
    a first body having a first space and a first cover, the first cover is disposed in the first space;
    a second body having a second cover for accommodating the first cover; and
    a plurality of seamless hinges arranged in the first cover and respectively connecting the first body and the second body, wherein each of the seamless hinges comprises:
    two fixing frames connected to the first cover;
    a shaft pivotally connected to the two fixing frames and having a gear portion located between the two fixing frames;
    a carrying frame slidably arranged in the two fixing frames and having a rack portion engaged with the gear portion; and
    two torsion members, which are respectively arranged in the two fixing frames, and each of the torsion members has an engaging portion and a clamping portion, and each of the engaging portions is arranged in a groove of each of the fixing frames, each of the clamping portions clamps each of the corresponding turning portions to provide a torque force,
    wherein, the first body and the second body are adapted to be closed or opened relative to each other, so that the each of the corresponding carrying frames slides relative to the fixing frames within an angular range and drives each of the shafts through each of the rack portions, so that each of the carrying frames rotates pivotally along a virtual axis, when being closed relative to each other, the first cover and the second cover are accommodated in the first space, and when being opened relative to each other, the first cover and the second cover are separated from each other.

11. The electronic device according to claim 10, wherein each of the fixing frames has a stopper, the two stoppers abut against each other, and a position-limiting slot is formed between the two fixing frames and located on one side of the two stoppers, the position-limiting slot is located on a lateral surface of the carrying frame, and the rack portion is disposed on the other lateral surface of the carrying frame opposite to the lateral surface.

12. The electronic device according to claim 11, wherein the carrying frame has a slider, which is formed on the lateral surface of the rack portion and disposed in the position-limiting slot, and the slider is adapted to reciprocate in the position-limiting slot.

13. The electronic device according to claim 12, wherein when the carrying frame rotates pivotally toward a first rotation direction and is perpendicular to each of the fixing frames, the slider abuts against the two stoppers, and when the carrying frame rotates pivotally toward a second rotation direction opposite to the first rotation direction, the slider is away from the two stoppers.

14. The electronic device according to claim 12, wherein the two fixing frames have an accommodating slot formed on the other side of the two stoppers relative to the position-limiting slot, when the carrying frame rotates pivotally toward a second rotation direction and is parallel to each of the fixing frames, the carrying frame is engaged with the accommodating slot.

15. The electronic device according to claim 10, wherein each of the fixing frames has a guiding slot surrounding a periphery of the shaft, the carrying frame has two sliding portions respectively formed on opposite sides of the rack portion and respectively arranged in the two guiding slots.

16. The electronic device according to claim 10, wherein the shaft has two turning portions, which are extended along an axial direction and formed at both ends of the gear portion, each of the fixing frames has a pivot hole, and the two turning portions are rotatably disposed through the two pivot holes of the two fixing frames respectively.

17. The electronic device according to claim 10, wherein the carrying frame has a connecting portion formed at one end of the rack portion and a plurality of through holes are formed at the connecting portion in a penetrating manner.

18. The electronic device according to claim 15, wherein each of the fixing frames has a sliding surface and a locking portion, the sliding surface is an arc surface, and each of the locking portions is formed on a wall surface of each of the fixing frames relative to each of the guiding slots and is locked to the first cover.

\* \* \* \* \*